(12) United States Patent
Wang et al.

(10) Patent No.: US 11,396,361 B2
(45) Date of Patent: Jul. 26, 2022

(54) FLAP SLAT CONTROL LEVER

(71) Applicants: COMMERCIAL AIRCRAFT CORPORATION OF CHINA, LTD., Shanghai (CN); SHANGHAI AIRCRAFT DESIGN AND RESEARCH INSTITUTE OF COMMERCIAL AIRCRAFT CORPORATION OF CHINA, Shanghai (CN)

(72) Inventors: Weida Wang, Shanghai (CN); Xiaoyi Wang, Shanghai (CN); Shaobo Yan, Shanghai (CN); Ji Zhao, Shanghai (CN); Xiangrong Xu, Shanghai (CN); Tong Liu, Shanghai (CN)

(73) Assignees: COMMERCIAL AIRCRAFT CORPORATION OF CHINA, LTD., Shanghai (CN); SHANGHAI AIRCRAFT DESIGN AND RESEARCH INSTITUTE OF COMMERICAL AIRCRAFT CORPORATION OF CHINA, Shanghai (CN)

( * ) Notice: Subject to any disclaimer, the term of this patent is extended or adjusted under 35 U.S.C. 154(b) by 310 days.

(21) Appl. No.: 16/633,011

(22) PCT Filed: Dec. 26, 2017

(86) PCT No.: PCT/CN2017/118560
§ 371 (c)(1),
(2) Date: Jan. 22, 2020

(87) PCT Pub. No.: WO2019/024401
PCT Pub. Date: Feb. 7, 2019

(65) Prior Publication Data
US 2021/0155339 A1     May 27, 2021

(30) Foreign Application Priority Data
Jul. 31, 2017    (CN) .......................... 201710641540.1

(51) Int. Cl.
*B64C 13/04*     (2006.01)
*B64C 13/50*     (2006.01)
(Continued)

(52) U.S. Cl.
CPC ........ *B64C 13/0425* (2018.01); *B64C 13/505* (2018.01); *G05B 9/03* (2013.01); *G06F 7/02* (2013.01)

(58) Field of Classification Search
CPC .......................... B64C 13/0425; B64C 13/505
(Continued)

(56) References Cited

U.S. PATENT DOCUMENTS 5,493,497 A * 2/1996 Buus ..................... G05D 1/0077
701/4
6,804,582 B1 * 10/2004 Gerhan ..................... F27B 3/28
373/88
(Continued)

FOREIGN PATENT DOCUMENTS

| CN | 103287574 A | 9/2013 |
| CN | 104527970 A | 4/2015 |

(Continued)

OTHER PUBLICATIONS

International Search Report with English translation and Written Opinion dated Apr. 28, 2018 in corresponding International Application No. PCT/CN2017/118560; 12 pages.

*Primary Examiner* — Joshua D Huson
*Assistant Examiner* — Shanna Danielle Glover
(74) *Attorney, Agent, or Firm* — Maier & Maier, PLLC

(57) ABSTRACT

A flap slat control lever and a method for operating the lever are disclosed. The lever includes: a first displacement sensor
(Continued)

to detect a displacement of the flap slat control lever and generate a first displacement detection signal; a second displacement sensor to detect the displacement of the flap slat control lever and generate a second displacement detection signal; a first control command module to receive the first displacement detection signal; and a second control command module to receive the second displacement detection signal, wherein the first control command module is in a standby state and the second control command module is in a working state.

17 Claims, 5 Drawing Sheets

(51) Int. Cl.
  *G05B 9/03* (2006.01)
  *G06F 7/02* (2006.01)
(58) Field of Classification Search
  USPC .......................................................... 702/41
  See application file for complete search history.

(56) References Cited

U.S. PATENT DOCUMENTS

| | | | | |
|---|---|---|---|---|
| 6,804,586 | B2* | 10/2004 | Richter | G05G 1/04 244/89 |
| 7,021,587 | B1* | 4/2006 | Younkin | G05D 1/0077 244/99.3 |
| 2006/0289696 | A1* | 12/2006 | Hanlon | B64C 13/505 244/35 R |
| 2017/0274986 | A1* | 9/2017 | Huynh | B64C 13/505 |

FOREIGN PATENT DOCUMENTS

| | | | |
|---|---|---|---|
| CN | 106628123 A | | 5/2017 |
| CN | 106767962 A | * | 5/2017 |
| CN | 107187582 A | | 9/2017 |
| EP | 2374714 A2 | | 10/2011 |
| WO | 2015/145456 A1 | | 10/2015 |

* cited by examiner

FLAP SLAT CONTROL LEVER

CROSS-REFERENCE TO RELATED APPLICATIONS

This application claims priority to Chinese Patent Application No. 201710641540.1 filed on Jul. 31, 2017, which is incorporated herein by reference in its entirety.

FIELD

This disclosure relates to an aircraft, and more particularly to a flap slat control lever of the aircraft.

BACKGROUND

A high-lift system of a modern large aircraft includes slats positioned at a leading edge of a wing and flaps positioned at a trailing edge of the wing. During a low speed stage such as take-off, landing, or the like, the slats at the leading edge and/or the flaps at the trailing edge can extend outward and/or bend downward to increase the wing area, thereby changing the configuration and providing lift for the aircraft. This makes sure that the aircraft has a reasonable taxiing distance and a safe take-off speed, while improving the climb rate, the approach speed and the approach attitude, etc.

A flap slat control lever (or Flap/Slat Control Lever, FSCL) is a control part of the high-lift system for controlling the extension and retraction of the flaps and slats. The FSCL is usually mounted on a central console for operation by a pilot. FIG. 1 illustrates a perspective view of a traditional FSCL, which includes for example a handle 101, a light guide plate 102 with position marks, a housing 103, a locking element 104, a pull rod 105 with a force-sensitive device, a spring assembly 106, a plunger 107, a locking pin 108, a sector gear 109, an engagement member 110, a pinion shaft 111, slots for engagement 112, a planetary gear train connected with the pull rod, and a four-way RVDT sensor (not shown), and the like. In operation, the pilot needs to lift the handle 101 first, and then move the handle 101 to actuate the pull rod 105 to move along a guide rail (usually in the form of a groove). During this process, the force-sensitive device of the pull rod 105 generates a lifting force and a friction force which hinder the movement. At the same time, the pull rod 105 actuates the planetary gear train to rotate so as to drive the RVDT sensor, which generates a pull rod displacement signal to be transmitted to a slat/flap control computer (SFCC). The SFCC can control the operation of the flaps and slats according to the pull rod displacement signal.

Although the function of the FSCL is simple, with the ever growing of the safety level and complexity of the aircraft system, the requirement on its availability has been increasing as well. The design requirement for failure probability of the high-lift system for an earlier single-channel aircraft is smaller than or equal to 1E-6. Thus, an FSCL with a traditional architecture can meet the system's requirement on its availability. The design requirement for failure probability of the high-lift system for a later large dual-channel aircraft is smaller than or equal to 1E-9. Such requirement is thus allocated to the lever from top to bottom, requiring that the failure probability of the lever should be smaller than or equal to 1E-9. A lever with a traditional architecture has a failure probability far from achieving the level of being smaller than 1E-9.

In addition, the comfort of operating the FSCL is also difficult to control. The lever has certain lifting force and friction force. The lifting force locks the lever within a corresponding slot. When the lever is to be moved, it is necessary to overcome the lifting force, so as to move the lever along the guide rail. When the lever is moved along the guide rail, it will generate a friction force. The friction force provides perceptibility for the pilot in the process of moving the lever. The design of the lifting force and the friction force should meet the human-machine efficacy and function needs. If the forces are too large, it will impose a burden on the pilot; otherwise if the forces are too small, it will be difficult for the lever to slide into the slot. If the friction force is too small, there will be no obvious feeling during the operation, and it may cause misoperation.

The disclosure intends to solve a technical problem of providing an improved flap slat control lever.

SUMMARY OF THE INVENTION

This disclosure provides an improved flap slat control lever.

According to one embodiment of this disclosure, a flap slat control lever comprises: a first displacement sensor to detect a displacement of the flap slat control lever and generate a first displacement detection signal; a second displacement sensor to detect the displacement of the flap slat control lever and generate a second displacement detection signal; a first control command module to receive the first displacement detection signal from the first displacement sensor; and a second control command module to receive the second displacement detection signal from the second displacement sensor, wherein the first control command module is in a standby state and the second control command module is in a working state, the first control command module sends the first displacement detection signal to the second control command module, wherein the second control command module compares the first displacement detection signal with the second displacement detection signal, and if a difference between the first displacement detection signal and the second displacement detection signal is within an error tolerance, sends the first displacement detection signal or the second displacement detection signal to a slat/flap control computer as a control signal to control operation of flaps and slats.

In one aspect, the second control command module sends either one, a larger one or a smaller one of the first displacement detection signal and the second displacement detection signal to the slat/flap control computer as the control signal to control the operation of the flaps and slats.

In one aspect, if the first control command module is in failure, the first control command module will not send the first displacement detection signal to the second control command module, and the second control command module sends the second displacement detection signal to the slat/flap control computer as the control signal to control the operation of the flaps and slats; or if the second control command module is in failure, the second control command module is switched to a deactivated state, and the first control command module is switched to a working state, wherein the first control command module sends the first displacement detection signal to the slat/flap control computer as the control signal to control the operation of the flaps and slats.

In one aspect, the first control command module and the second control command module verify whether the first displacement detection signal and the second displacement detection signal are within a preset range of values respectively, wherein the first control command module being in failure comprises the first control command module failing the verification of the first displacement detection signal, and wherein the second control command module being in failure comprises the second control command module failing the verification of the second displacement detection signal, or the second control command module determining that the difference between the first displacement detection signal and the second displacement detection signal is not within the error tolerance for a predetermined times.

In one aspect, the first control command module and the second control command module each comprises a monitor channel and receives the first displacement detection signal from the first displacement sensor and the second displacement detection signal from the second displacement sensor respectively via the monitor channels.

In one aspect, the flap slat control lever also comprises: a lifting force mechanism to generate a lifting force for the flap slat control lever; a friction force mechanism to generate a friction force during movement of the flap slat control lever, wherein the first control command module and the second control command module each comprises a control channel to control the lifting force of the lifting force mechanism and the friction force of the friction force mechanism when in the working state.

In one aspect, the flap slat control lever also comprises: a force sensor to sense a force applied on the flap slat control lever to generate a force signal; and a third control command module to receive the force signal, and if the force signal is above a preset threshold, send a valid discrete signal to the slat/flap control computer to extend the flaps and slats to a go-around configuration.

In one aspect, the slat/flap control computer operates according to the valid discrete signal from the third control command module when receiving both the control signal from the first control command module or the second control command module and the valid discrete signal from the third control command module.

In one aspect, the first displacement sensor and the second displacement sensor each comprises any one of a RVDT, a potentiometer, or a photoelectric encoder.

In one aspect, the photoelectric encoder comprises a grating plate and a photoelectric detection device, wherein the photoelectric encoder outputs three groups of square wave pulses with phase-A, phase-B and phase-Z respectively, wherein the two groups of pulses with phase-A and phase-B determine a motion direction of the lever, and the pulses with phase-Z determine a position of the lever.

According to another embodiment of this disclosure, a method for operating a flap slat control lever is provided, the method comprising: detecting a displacement of the flap slat control lever and generating a first displacement detection signal; detecting the displacement of the flap slat control lever and generating a second displacement detection signal; using a first control command module to receive the first displacement detection signal; and using a second control command module to receive the second displacement detection signal, wherein the first control command module is in a standby state and the second control command module is in a working state, the first control command module sends the first displacement detection signal to the second control command module, wherein the second control command module compares the first displacement detection signal with the second displacement detection signal, and if a difference between the first displacement detection signal and the second displacement detection signal is within an error tolerance, sends the first displacement detection signal or the second displacement detection signal to a slat/flap control computer as a control signal to control operation of flaps and slats.

In one aspect, the second control command module sends either one, a larger one or a smaller one of the first displacement detection signal and the second displacement detection signal to the slat/flap control computer as the control signal to control the operation of the flaps and slats.

In one aspect, if the first control command module is in failure, the first control command module will not send the first displacement detection signal to the second control command module, and the second control command module sends the second displacement detection signal to the slat/flap control computer as the control signal to control the operation of the flaps and slats; or if the second control command module is in failure, the second control command module is switched to a deactivated state, and the first control command module is switched to a working state, wherein the first control command module sends the first displacement detection signal to the slat/flap control computer as the control signal to control the operation of the flaps and slats.

In one aspect, the first control command module and the second control command module verify whether the first displacement detection signal and the second displacement detection signal are within a preset range of values respectively, wherein the first control command module being in failure comprises the first control command module failing the verification of the first displacement detection signal, and wherein the second control command module being in failure comprises the second control command module failing the verification of the second displacement detection signal, or the second control command module determining that the difference between the first displacement detection signal and the second displacement detection signal is not within the error tolerance for a predetermined times.

In one aspect, the method also comprises: controlling, by the first control command module or the second control command module in the working state and through a control channel, a lifting force and a friction force of the flap slat control lever.

In one aspect, the method also comprises: sensing a force applied on the flap slat control lever to generate a force signal; and using a third control command module to receive the force signal, and if the force signal is above a preset threshold, sending a valid discrete signal to the slat/flap control computer to extend the flaps and slats to a go-around configuration.

In one aspect, the method also comprises: operating, by the slat/flap control computer, according to the valid discrete signal from the third control command module when receiving both the control signal from the first control command module or the second control command module and the valid discrete signal from the third control command module.

The flap slat control lever of this disclosure employs multiple redundancy measures, and optionally has adjustable lifting force and friction force. The flap slat control lever includes a plurality of displacement sensors and a plurality of control command modules. Different combinations of these components ensure that the pilot can operate the FSCL under any predictable operation condition, so as to output a useful command signal to the high-lift system. Furthermore, the flap slat control lever can also adjust the lifting force and/or the friction force of the FSCL, so as to accommodate different system/operator requirements.

DETAILED DESCRIPTION OF THE INVENTION

This disclosure is further explained below in connection with specific embodiments and figures. However, the scope of this disclosure is not limited thereto.

Figure 1:
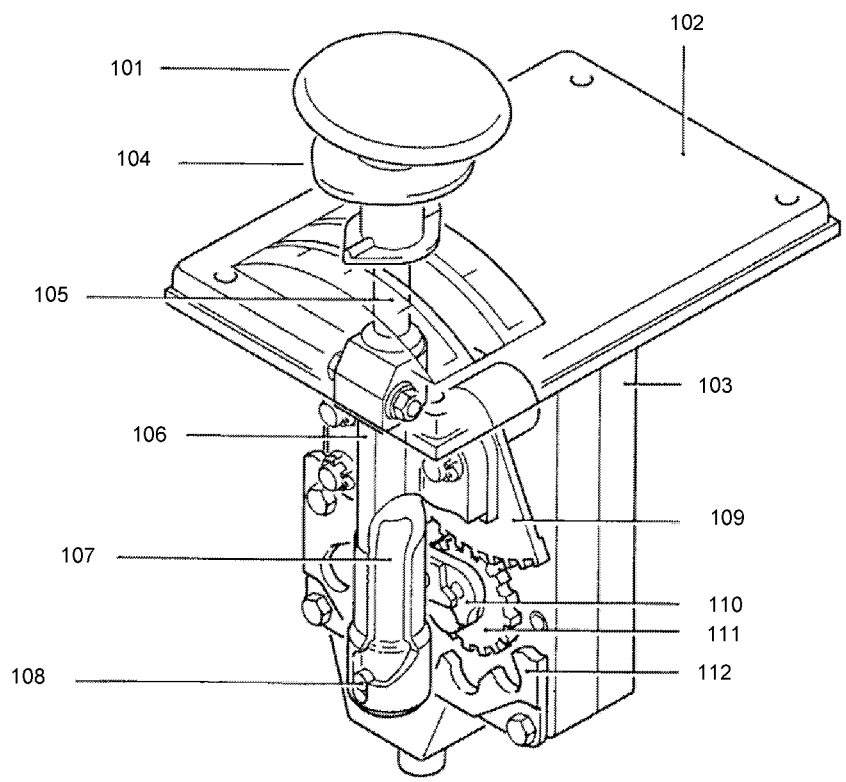
FIG. 1 illustrates a perspective view of a traditional FSCL.
Figure 2:
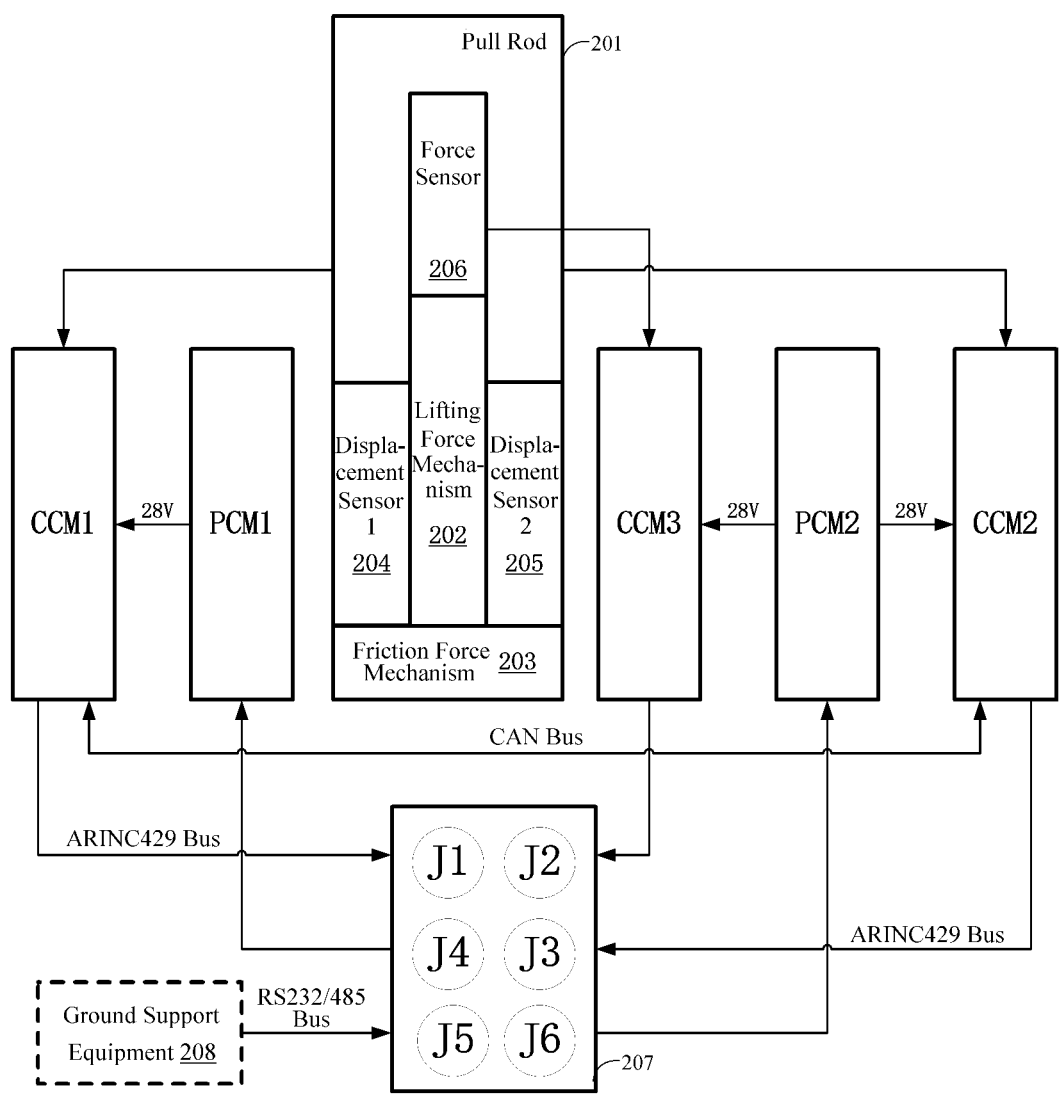
FIG. 2 illustrates a schematic architectural diagram of an FSCL according to an embodiment of this disclosure.

FIG. 2 illustrates a schematic architectural diagram of a flap slat control lever (FSCL) 200 according to an embodiment of this disclosure. The flap slat control lever 200 may include basic mechanical components, such as a handle (not shown), a pull rod 201, a groove-type guide rail, and gears (not shown), and the like. As an example, the FSCL 200 may have an appearance similar to the traditional FSCL of FIG. 1. As shown in FIG. 2, the FSCL 200 may include a lifting force mechanism 202, a friction force mechanism 203, a first displacement sensor 204, a second displacement sensor 205, an optional force sensor 206, a first control command module CCM1, a second control command module CCM2, an optional third control command module CCM3, a first power control module PCM1 and a second power control module PCM2, a connector assembly 207, etc. In a specific implementation, the FSCL 200 may also include other unshown components for implementing flap and/or slat operations, or include fewer components than those shown in FIG. 2. For example, in one embodiment, the FSCL 200 may include CCM1 and CCM2, but not CCM3 and other corresponding components. In another embodiment, the FSCL 200 may include more CCMs.

The lifting force mechanism 202 may control a lifting force required to lift the lever 200, and the friction force mechanism 203 may control a friction force generated by moving the lever 200. The PCM1 may be connected with a DC (Direct Current) normal bus (e.g., 28V), providing power to the CCM1; the PCM2 may be connected with a DC emergency bus (e.g., 28V), providing power to the CCM2 and CCM3. By way of example and not limitation, each PCM may provide a DC power of +5V, +15V, −15V or other voltage level to a corresponding CCM. Alternatively, the FSCL 200 may use one power control module (PCM) to provide necessary voltages for various components.

The first displacement sensor 204 and the second displacement sensor 205 may detect a pull rod displacement of the FSCL 200 and generate a pull rod displacement signal. Various control command modules (CCMs) may process and output the pull rod displacement signal for controlling the operation of flaps and slats of the aircraft. In some aspects, an aircraft may include one slat/flap control computer (SFCC) to control the operation of the flaps and slats on both sides of the aircraft. In some other aspects, an aircraft may include two slat/flap control computers (SFCCs), wherein each SFCC controls the operation of the flaps and slats on a corresponding side of the aircraft. Whether there is one SFCC or two SFCCs, these SFCCs control the operation of the flaps and slats of the aircraft according to a lever displacement signal generated by the flap slat control lever 200.

Traditionally, a sensor architecture for measuring the lever displacement generally employs a RVDT or a potentiometer. The first displacement sensor 204 and the second displacement sensor 205 of this disclosure may each be selected from any one of a RVDT, a potentiometer, a photoelectric encoder, or the like. An advantage of the photoelectric encoder is that the displacement signal indicating the lever position can be directly converted to a digital pulse signal recognizable by a computer, without additional analog-digital conversion. In one embodiment, the photoelectric encoder may include a grating plate and a photoelectric detection device. An additional planetary gear train is mounted at a gear on the end of the pull rod. The grating plates of two photoelectric encoders (preferably being incremental) are mounted at both ends of the pinion shaft, and the photoelectric detection devices are mounted on the corresponding flanges. With the photoelectric conversion principle, the incremental encoder may directly output three groups of square wave pulses with phase-A, phase-B and phase-Z respectively. The two groups of pulses with phase-A and phase-B have a phase difference of 90°, and may be used to determine a motion direction of the lever. One pulse with phase-Z will be generated for each circle, and is used for positioning of a reference point.

The connector assembly 207 may enable communications between the flap slat control lever 200 and other devices (such as a ground support equipment 208, a slat/flap control computer (SFCC)). By way of example and not limitation, the connector assembly 207 is shown with 6 jacks, J1, J2, J3, J4, J5 and J6 respectively (e.g., in the form of MIL-DTL-38999). J1 is used to connect CCM1 with a slat/flap control computer (SFCC) (e.g., via ARINC429 bus); J2 is used to connect PCM1 with a DC normal bus (e.g., 28V); J3 is used to connect CCM2 with the SFCC (e.g., via ARINC429 bus); J4 is used to connect PCM2 with a DC emergency bus (for example, 28V); J5 is used to connect CCM3 with the SFCC; J6 is used as a test interface for connecting a ground support equipment with all the CCMs (for example, via RS232/485 bus). Furthermore, the connector assembly 207 may provide lightning electromagnetic shield, to ensure the safety and reliability of the communications between the flap slat control lever 200 and other devices. The connector assembly 207 in FIG. 2 is merely an example. In practice, connector assembly 207 with other forms and other number of jacks may be employed as needed. Also, different buses may be employed to communicate between various components.

According to one embodiment of this disclosure, the FSCL 200 may include a first displacement sensor 204, a second displacement sensor 205, a CCM1 and a CCM2. The first displacement sensor 204 and the second displacement sensor 205 are used to sense a displacement of the lever 200 and generate a first displacement detection signal and a second displacement detection signal respectively. The CCM1 and CCM2 may each include a monitor channel (which may include a monitor processor), to respectively receive/process the first displacement detection signal from the first displacement sensor 204 and the second displacement detection signal from the second displacement sensor 205. The CCM1 and CCM2 may verify the first displacement detection signal and the second displacement detection signal respectively, to determine whether the first displacement detection signal and the second displacement detection signal are within a reasonable preset range of values. The CCM1 and CCM2 may further process the displacement detection signals that passed the verification, as described in greater details below. According to another embodiment of this disclosure, the FSCL 200 may further include a force sensor 206 and a CCM3. The force sensor 206 may detect a force applied on the lever by an operator (e.g., the pilot), and transmit the detected force to the CCM3 for processing. The CCM1 and CCM2 will operate in coordination with the CCM3, to control the operation of flaps and slats of the aircraft, as further described below.

(a) Procedure of Data Processing within CCM1 and CCM2

At any time, at most one of the CCM1 and CCM2 is in a working state, and the other one is in a standby state. Whether being in the working state or the standby state, the CCM1 and CCM2 may receive a displacement signal from the first displacement sensor 204 and the second displacement sensor 205 respectively, and verify the respective received displacement signal (for example, to determine that the detected first displacement detection signal and second displacement detection signal are within a reasonable preset range of values). If both CCM1 and CCM2 succeed in the verification, the CCM in the standby state sends its detected displacement data to the CCM in the working state (e.g., through CAN bus). The displacement data of the two CCMs can be compared by the CCM in the working state. If a difference between the two sets of displacement data is within an allowable error tolerance, then the comparison is considered as successful, and either one, a larger one or a smaller one of the two sets of displacement data is taken as final displacement data (or a control signal based on this displacement data) for sending to the SFCC to control the operation of the flaps and slats.

If the CCM in the standby state fails the verification of displacement signal, it will not send its detected displacement signal to the CCM in the working state. If the CCM in the standby state consecutively fails the verification of displacement signal for many times, its monitor processor may trigger a failure protection logic. The CCM in the standby state may be deactivated and no longer process the displacement signal, until it is reset to process a displacement signal again. If the CCM in the working state fails the verification of displacement signal, its monitor processor may trigger a failure protection logic, to deadlock the CCM in the working state (i.e., to enter a deactivated state), and to automatically switch the CCM in the standby state to a working state. If the data comparison between the two CCMs is unsuccessful (e.g., consecutively unsuccessful for two frames, three frames, etc.), the monitor processor may trigger a failure protection logic to deadlock the CCM in the working state, and to automatically activate the CCM in the standby state. When a CCM fails the verification of displacement signal or the data comparison between the two CCMs is unsuccessful, a warning device can be triggered, to alert the operator of a malfunction of the flap slat control lever.

2) Procedure of Data Processing within CCM3

As described above, in one embodiment, in addition to the CCM1 and CCM2, the FSCL 200 may further include a force sensor 206 and a CCM3. The CCM3 may consist of a simple analog circuit and is connected with the SFCC through a hard wire. The force sensor 206 senses a force applied on the flap slat control lever to generate a force signal, and transmits the force signal to the CCM3. When the FSCL 200 is working normally and either CCM1 or CCM2 is in the normal working state, the force signal will be below a threshold, and the CCM3 maintains a 0V level (e.g., a discrete signal 0) on the hard wire, which will not affect the operation of the SFCC. The threshold may be determined by the system designer and/or the pilot. When the flap slat control lever is stuck, the pilot needs to use a strong force to pull the lever rearward. The force signal sensed by the force sensor 206 will be above the threshold, and thus the CCM3 outputs a valid discrete signal (e.g., 1), causing the SFCC to extend the flaps and/or slats to a go-around configuration. For example, 1) if the slats and flaps are in 0° positions, the slats extend to the maximum positions first, then the flaps extend to the go-around positions; 2) if the slats have been already extended to the maximum positions, then the flaps directly extend to the go-around positions. If the force signal is not above the threshold, the CCM3 outputs a discrete signal 0, and the SFCC will not operate. In an alternative embodiment, the SFCC may cause the flaps and/or slats to perform other designated operations when receiving the valid discrete signal 1.

In another aspect, if the flap slat control lever is not stuck but CCM1 and CCM2 both fail (for example, unable to provide valid displacement detection data), the pilot may move the lever to the rearmost slot for engagement, and operate the lever with a strong force such that the force signal sensed by the force sensor 206 is above the threshold, and the CCM3 will output a valid discrete signal (e.g., 1), making the flaps and slats extend to the go-around configuration. Thus, the flap slat control lever of this disclosure can avoid the problem of being unable to control the flaps and slats in the event that the flap slat control lever is stuck and/or the CCM1 and CCM2 both fail. Further, the slat/flap control computer (SFCC) may provide a warning signal when it receives the valid discrete signal (e.g., 1), indicating that the flap slat control lever is not in a normal working state (e.g., the lever is stuck, the CCM1 and CCM2 both fail, etc.).

By way of example and not limitation, the CCM3 may include a subtractor and a 28V/OPEN signal output circuit. A reference voltage for the subtractor may be 5V. The CCM3 receives a voltage signal sent by a force sensor component, and performs calculation through the subtractor. If an output result of the subtractor is above a preset voltage threshold (e.g., 5V), then a 28V signal (i.e., valid discrete signal 1) is output to the SFCC via the 28V/OPEN signal output circuit, such that the SFCC may extend the flaps and slats to the go-around configuration. If the output result of the subtractor is below 5V, then the 28V/OPEN signal output circuit will output a 0V signal to the SFCC. The SFCC receives the discrete signal 0, determines that the lever is not being operated, and the SFCC may not operate. The voltage levels exemplified above are only examples. In practice, other voltage levels may be employed without departing from the scope of this disclosure.

Various operation modes of the flap slat control lever of this disclosure for monitoring the lever manipulation are illustrated below. It can be understood by those skilled in the art that the CCM1 and CCM2 are interchangeable.

In a first mode, the CCM1 is in a standby state and the CCM2 is in a working state. The CCM1 may receive a first displacement detection signal from the first displacement sensor 204 and sends it to the CCM2 (assuming that the verification of the first displacement detection signal is correct). The CCM2 may receive a second displacement detection signal from the second displacement sensor 205 (assuming that the verification of the second displacement detection signal is correct). The CCM2 compares the first displacement detection signal with the second displacement detection signal, and if a difference between them is within an error tolerance, sends the first displacement detection signal or the second displacement detection signal to the slat/flap control computer (SFCC) as a control signal to control the operation of the flaps and slats. In an alternative scheme, in the event that the difference is within the error tolerance, the CCM2 may send a larger one of the first displacement detection signal and the second displacement detection signal to the slat/flap control computer (SFCC) as a control signal to control the operation of the flaps and slats. In another alternative scheme, in the event that the difference is within the error tolerance, the CCM2 may send the second displacement detection signal it receives to the slat/flap control computer (SFCC) as a control signal to control the operation of the flaps and slats.

In a second mode, if the CCM1 in the standby state is in failure (for example, the verification of the first displacement detection signal is incorrect, fails to receive the first displacement detection signal, or the self-test system of the CCM1 reports a failure), then its monitor processor may trigger a failure protection logic to deadlock the CCM1 and notify the CCM2. The CCM2 in the working state may directly send the second displacement detection signal (assuming that the verification of the second displacement detection signal is correct) to the slat/flap control computer (SFCC) as a control signal to control the operation of the flaps and slats.

In a third mode, if the CCM2 in the working state is in failure (for example, the verification of the second displacement detection signal is incorrect, fails to receive the second displacement detection signal, or the self-test system of the CCM2 reports a failure, or the CCM2 determines that the difference between the first displacement detection signal and the second displacement detection signal is not within the error tolerance for a predetermined times), then its monitor processor may trigger a failure protection logic to deadlock the CCM2 and notify the CCM1, thereby switching the CCM1 to the working state. The CCM1 then sends the first displacement detection signal to the slat/flap control computer (SFCC) as a control signal to control the operation of the flaps and slats (assuming that the verification of the first displacement detection signal is correct).

In a fourth mode, the FSCL 200 also includes a force sensor 206 and a CCM3. The force sensor 206 senses a force applied on the flap slat control lever to generate a force signal, and transmits it to the CCM3. When the FSCL 200 is working normally and the CCM1 or CCM2 is in a normal working state, the force signal would be below a threshold, and the CCM3 maintains 0V level (i.e., discrete signal 0) on the hard wire, which will not affect the operation of the SFCC. If the force signal sensed by the force sensor 206 is above the threshold, then the CCM3 outputs a valid discrete signal (e.g., 1), causing the SFCC to extend the flaps and/or slats to the go-around configuration.

Figure 3:
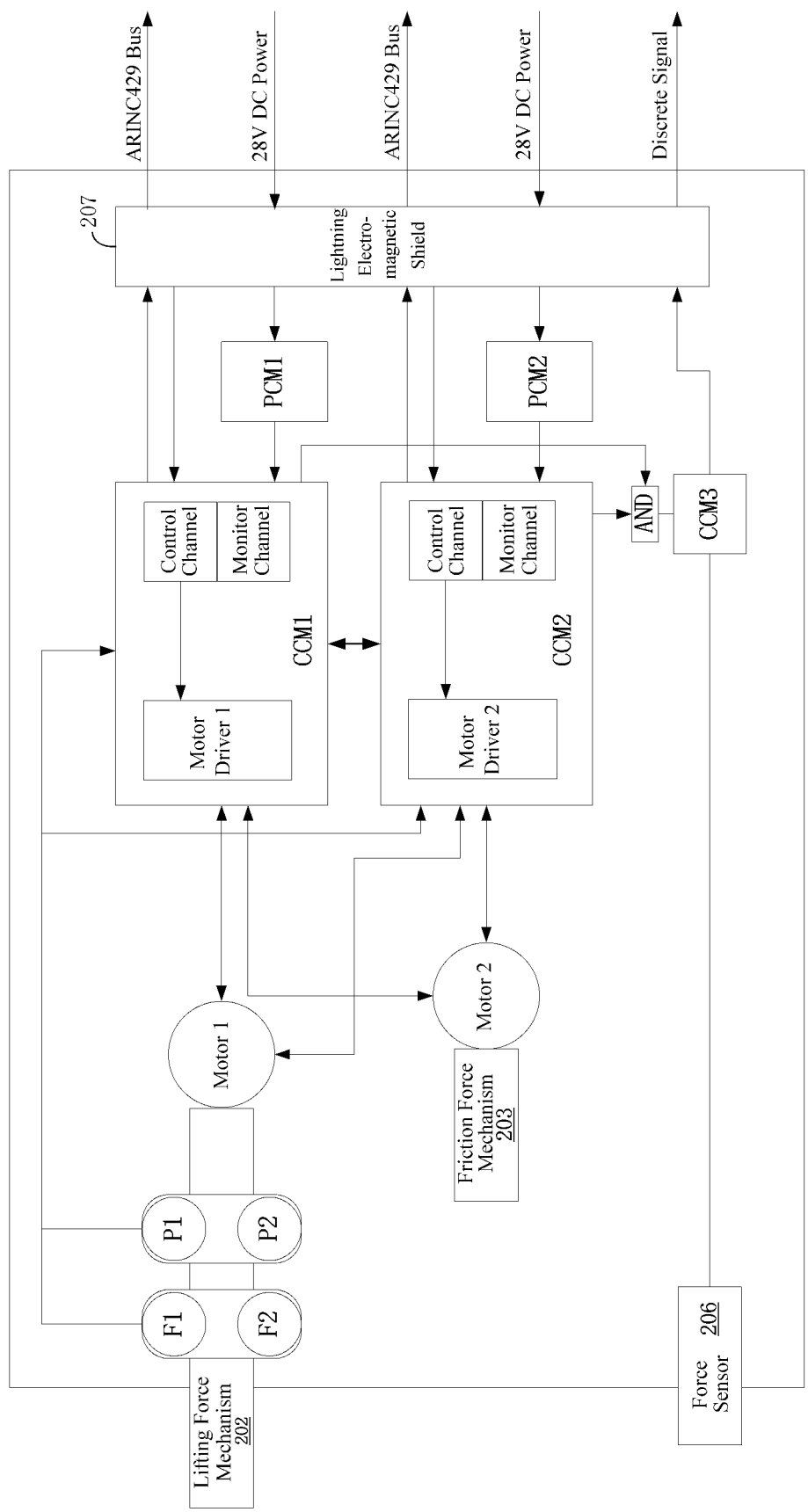
FIG. 3 illustrates a schematic component diagram of an FSCL according to another embodiment of this disclosure.

FIG. 3 illustrates a schematic component diagram of an FSCL according to another embodiment of this disclosure. The components in FIG. 3 similar to those in FIG. 2 are denoted by like reference numerals. In this embodiment, the CCM1 and CCM2 each may be a dual-channel control command module. For example, the CCM1 and CCM2 may each include a monitor channel and a control channel, each channel having a monitor processor and a control processor for signal processing. The CCM1 and CCM2 may utilize their monitor channels to receive a first displacement detection signal from the first displacement sensor 204 (P1 in FIG. 3) and a second displacement detection signal from the second displacement sensor 205 (P2 in FIG. 3) respectively, as described above with reference to FIG. 2.

In a further embodiment, the CCM1 and CCM2 may each have an interface FPGA to communicate with the control processor, the monitor processor, the displacement sensor and the slat/flap control computer (SFCC), etc. through a bus. The interface FPGA can receive a digital pulse signal of the photoelectric encoder and a motor output shaft position signal with a 50 ms or less acquisition period, and then distribute the signals to the control processor of the control channel and the monitor processor of the monitor channel. The control processor functions as a calculation element, and employs the frequency method (M method) to process the true code structure of the signal data; the monitor processor functions as a check element, and employs the frequency method (M method) to process the complement code structure of the signal data. The two processors send the processed displacement signals to the interface FPGA, which uniforms the encoding formats of the two displacement signals and then perform comparison. If the comparison is successful and the detected displacement signals are within a reasonable range of values, then it is considered that the CCM has acquired a valid displacement data. The interface FPGA of the CCM in the standby state sends its valid displacement data to the CCM in the working state through the CAN bus. The CCM in the working state compares the displacement data of the two CCMs. If a difference between the two sets of displacement data is within an allowable error tolerance, then the comparison is considered as successful, and either one or a larger one of the two sets of displacement data is taken as a control signal for sending to the SFCC to control the operation of the flaps and slats.

As the interface FPGA provides data for two processors and performs some data computation, the data integrity may be guaranteed using the following measures.

(1) The interface PFGA stores 5V, 3.3V, 7.5V, 2.5V and ground reference voltages. The control processor periodically reads and checks these data. In other implementations, different voltage levels may be used as well.

(2) The interface FPGA periodically generates a pseudo-random sequence to send to the two processors. The processors then return the sequence back to the interface FPGA. If the returned sequence is the same as the original sequence, then the interface FPGA will reset a watchdog FPGA of the processors. If the returned sequence is different from the original sequence, then the watchdog FPGA is activated to deadlock the corresponding CCM, and no data or command is output any more.

(3) The interface FPGA transmits and echoes ARINC429 data (e.g., a lever displacement signal). As an example, generally, a data frame Label 107 may be used to represent the lever displacement signal. This data frame has 32 bits in total, wherein bits 1 to 8 identify it as Label 107; bits 9 to 10 identify a source device of this data frame; bits 11 to 29 identify contents of the data frame, which are usually numerical values; bits 30 and 31 identify SSM (Signal State Matrix); bit 32 is a parity bit. The control processor checks the echoed ARINC429 data. Due to the importance of the lever displacement signal, the monitor processor is responsible for setting the SSM of ARINC429 data. The SSM may indicate the validity of the ARINC429 bus data frame. For example, 00 represents Failure Warning; 10 represents No Computed Data; 01 represents Functional Test; 11 represents Normal Operation. Under normal situation, the ARINC429 bus label is valid only when the SSM is 11.

In addition, this FSCL may have adjustable lifting force and friction force. As shown in FIG. 3, the FSCL may include a motor 1 and a motor 2, wherein the motor 1 controls the lifting force of the lifting force mechanism 202, and the motor 2 controls the friction force of the friction force mechanism 203. As described above, the CCM1 and CCM2 may each include a monitor channel and a control channel, and may configure the working parameters of the motor 1 and motor 2 through the control channel.

The CCM1 and CCM2 may include a motor driver 1 and a motor driver 2, respectively. The control command module (CCM) of CCM1 and CCM2 in the working state (e.g., CCM1 or CCM2) may receive a lifting force/friction force adjustment command from the ground support equipment 208, and control its corresponding motor driver (motor driver 1 or motor driver 2) through the control channel, such that the motor driver configures the lifting force of the lifting force mechanism 202 and the friction force of the friction force mechanism 203, as further described below with reference to FIG. 4 and FIG. 5.

The ground support equipment (GSE) 208 may access the CCM1 or CCM2 in the working state through RS232/485 bus and perform the following operations:

a) controlling motor 1 in the lifting force mechanism 202 to adjust the lifting force, and reading a numerical value of the lifting force (using force sensors F1 and F2);

b) controlling motor 2 of the friction force mechanism 203 to adjust the friction force;

c) uploading system software(s);

d) downloading NVM (non-volatile memory) data;

e) removing failure data of the lever, etc.

Figure 4:
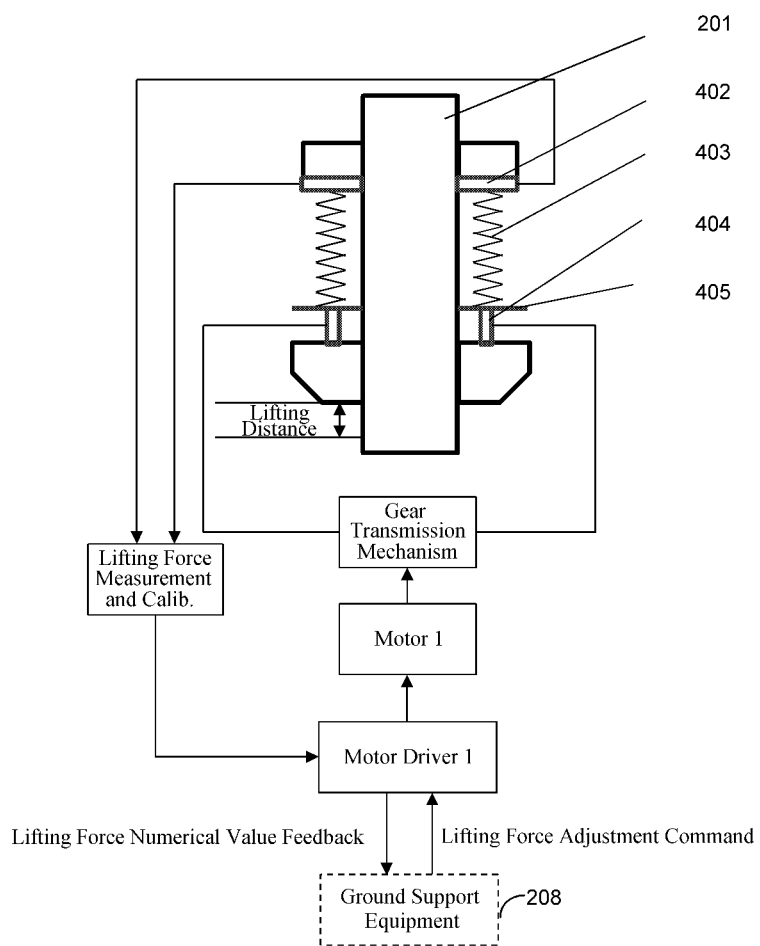
FIG. 4 illustrates a schematic diagram of a lifting force mechanism according to an embodiment of this disclosure.

FIG. 4 illustrates a schematic diagram of the lifting force mechanism 202 according to an embodiment of this disclosure. The lifting force of the FSCL is usually generated by a spring 403, which itself has a certain preload force. When the FSCL is lifted by a distance, the spring is pressed to generate a force. The maximum spring preload force to be overcome during lifting the FSCL is the lifting force of the FSCL. A support plate 405 and a scalable support tube 404 are added in the lifting force mechanism. A brushless DC motor is introduced and connected with the scalable support tube through a helical gear box or other gear transmission mechanisms. When the motor output shaft rotates clockwise, it actuates the gear transmission mechanism to extend the scalable support tube, pushing the support plate upward and increasing the compression of turns of the spring, thereby increasing the preload force of the spring and accordingly the lifting force of the lever. When the motor output shaft rotates anticlockwise, it actuates the gear transmission mechanism to extract the scalable support tube. The preload force of the spring pushes the support plate downward and the compression of turns of the spring is decreased, thereby decreasing the preload force of the spring and accordingly the lifting force of the lever. After the numerical value of the spring force is acquired by a spring pressure sensor 402, it is feedback to a control module for calibration. By way of example and not limitation, the default lifting force of the FSCL lifting force mechanism is 30N, and the adjustment precision is 0.5N. When the motor rotates one cycle clockwise, the lifting force is increased by 1N; when the motor rotates one cycle anticlockwise, the lifting force is decreased by 1N. The maximum limit of the FSCL lifting force may be 40N, and the minimum limit may be 20N. In practice, other numerical values may be set as well.

Figure 5:
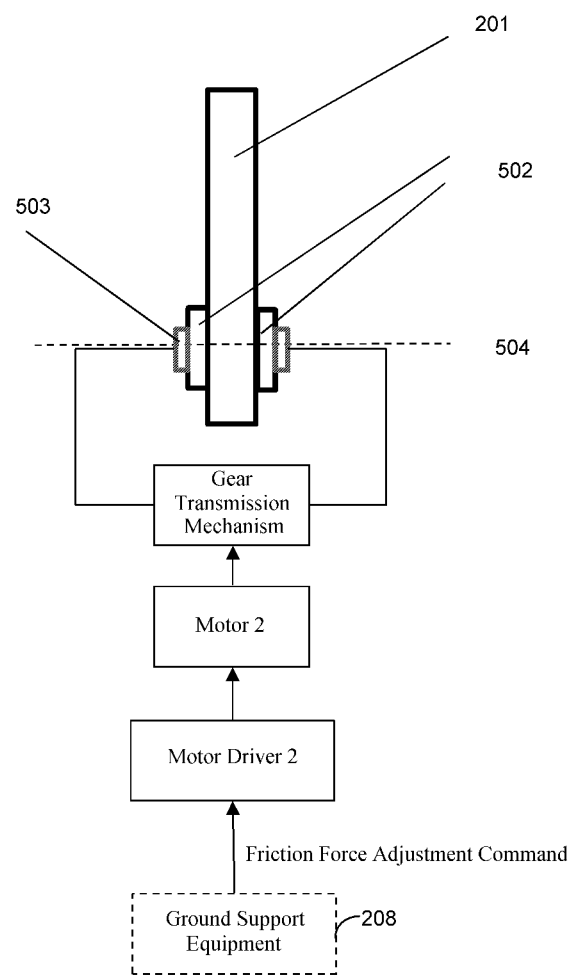
FIG. 5 illustrates a schematic diagram of a friction force mechanism according to an embodiment of this disclosure.

FIG. 5 illustrates a schematic diagram of a friction force mechanism 203 according to an embodiment of this disclosure. The friction force mechanism 203 is positioned at the end of the FSCL pull rod. The friction force is usually generated by friction generators 502. The pilot needs to overcome the friction force to move the FSCL. When the FSCL is not moved, the friction force maintains the lever within a corresponding slot, avoiding offset or jitter. This disclosure introduces a brushless DC motor and an adjustment piece 503. The brushless DC motor drives a spur gear box or other gear transmission mechanism to move. When the motor output shaft 504 rotates clockwise, it actuates the adjustment piece to press the friction generators, reducing the distance between the two friction generators and thus increasing the friction force; when the motor output shaft rotates anticlockwise, it actuates the adjustment piece to relax the friction generators, increasing the distance between the two friction generators and thus decreasing the friction force.

Figure 6:
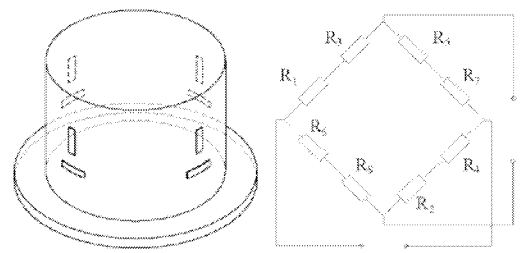
FIG. 6 illustrates a schematic diagram of a force sensor according to an embodiment of this disclosure.

FIG. 6 illustrates a schematic diagram of a force sensor according to an embodiment of this disclosure. The force sensor 206 may be embedded in the lever or pull rod, and may employ a traditional strain gauge type pressure sensor. If the force sensor is mounted inside the pull rod, a cylindrical elastic-sensitive element may be selected for use. To ensure the sensitivity of measurement and reduce nonlinear error, a differential full bridge measurement circuit consisting of 8 strain gauges may be selected for use, wherein 4 strain gauges are pasted along the axial direction to reduce the influence of bending moment, and the other 4 strain gauges are pasted along the radial direction for temperature compensation. When the lever is mechanically stuck, the pilot needs to use a strong force to pull the lever rearward. When the force applied on the lever by the pilot is above a threshold, the control surface will extend to a required command position, wherein the threshold may be determined by the system designer and/or the pilot.

On a flight date, after the aircraft is powered on, the FSCL first performs a power-on self-test, and then performs an initialization self-test. After the above self-tests are finished, a continuous self-test is then performed. The failures detected may be recorded in a non-volatile memory in a control branch.

a) power-on self-test

The control channel and the monitor channel perform the power-on self-test. The test may include:

1) a microprocessor circuit;
 2) a boot program read-only memory and check;
 3) an application program read-only memory and check;
 4) read-only memory read/write test;
 5) watchdog timer test;
 6) test of data access from a non-read-only memory;
 7) a microprocessor protection circuit;
 8) failure protection cut-off test;
 9) monitor channel cut-off test;
 10) power monitor circuit test;
 11) a discrete input interface.

b) initialization self-test

The control channel performs the initialization self-test. This type of test is performed once upon the first power-on every day. If this test is interrupted by an FSCL command, then the test is considered as unfinished and will be performed again upon the next power-on this day. The test may include:

1) motor brake test;
 2) regenerative resistor test;
 3) motor electrical and electronic device and motor drive interface test, etc.

c) continuous self-test

The control channel performs the continuous self-test. The test may include sensor exciting voltage and current monitoring, sensor reasonable range testing, data reception system monitoring, brake monitoring, sensor validity testing, etc.

If the FSCL functions normally, the CCM1 and CCM2 may alternately enter the working state according to the odd and even date of flight. Three CCM modules (CCM1, CCM2, CCM3) may be in working-standby-working states. The CCM in the working state by default sends ARINC429 data with SSM bit being "Normal Operation"; the CCM in the standby state sends ARINC429 data with SSM bit being "No computed data"; and the CCM3 sends a discrete signal "0" if the lever is working normally. Moreover, two circuit breakers for the lever may be set inside the cockpit, for resetting the CCMs of the lever.

a) Instance with Two CCMs (CCM1 and CCM2) in Operation

The CCM1 receives the first displacement detection signal detected by the first displacement sensor 204 (e.g., a first photoelectric encoder); the CCM2 receives the second displacement detection signal detected by the second displacement sensor 205 (e.g., a second photoelectric encoder). The two CCMs each perform internal processing on the displacement detection signals, and the two displacement detection signals are compared by the CCM in the working state. If the comparison indicates consistency, the CCM in the working state sends a final displacement result (the first displacement detection signal or the second displacement detection signal) as a control signal to the SFCC through ARINC429 bus.

b) Instance with One CCM (CCM1 or CCM2) in Operation

If the data comparison between the two CCMs indicates inconsistency for several consecutive frames (e.g., two frames, three frames, etc.), or the CCM in the working state is in failure, then this CCM will autonomously trigger a failure protection logic, and sends a trigger signal to the CCM in the standby state. The CCM in the working state is switched to a deactivated state, and the SSM bit of ARINC429 bus data sent out is switched from "Normal Operation" to "Failure Warning". The CCM in the standby state is switched to the working state after receiving the trigger signal, and the SSM bit of ARINC429 bus data sent out is switched from "No computed data" to "Normal Operation". This CCM no longer receives or compares displacement detection data of a CCM in the standby state, but directly sends the displacement detection signal received by this CCM to the SFCC as a control signal through ARINC429 bus.

c) Instance with CCM3 in Operation

The CCM3 receives and processes a force signal generated by the force sensor 206 sensing the force applied on the flap slat control lever. When the force signal is below a threshold, the CCM3 generates a discrete signal 0, which will not affect operation of the SFCC. When the force signal is above the threshold, the CCM3 generates a valid discrete signal (e.g., 1), causing the SFCC to extend the flaps and/or slats to the go-around configuration. The valid discrete signal (e.g., 1) may indicate that the flap slat control lever is not in a normal working state (for example, the lever is stuck, the CCM1 and CCM2 both fail, etc.). The SFCC may detect the discrete signal for about 5 to 20 seconds, preferably 8 seconds.

If the SFCC receives the valid discrete signal from the CCM3 while receiving a displacement detection signal (ARINC429 bus data) sent from the CCM1 or CCM2, then the displacement detection signal will not be processed. Instead, the valid discrete signal from the CCM3 will be processed, thereby extending the flaps and/or slats to the go-around configuration.

As described above, at most one of the CCM1 and CCM2 is in the working state, and the other one is in the standby state. For example, the CCM1 may be in the standby state and the CCM2 may be in the working state, or vice versa. When the present disclosure describes that one (e.g., first or second) control command module is in the working state, this control command module may refer to CCM1 or CCM2, and the other control command module (CCM2 or CCM1) is in the standby state.

The flap slat control lever of this disclosure employs multiple redundancy measures, and optionally has adjustable lifting force and friction force. Such a flap slat control lever includes a plurality of displacement sensors and a plurality of control command modules. Different combinations of the above components ensure that the pilot can operate the FSCL under any predictable working condition, thereby outputting a useful command signal to the high-lift system. Furthermore, such a flap slat control lever can also adjust the lifting force and/or the friction force of the FSCL, thus accommodating different system/operator requirements.

The embodiments of this disclosure have been described above with reference to the figures. However, this disclosure is not limited to the above specific implementations, and the above specific implementations are merely illustrative and not limiting. In view of this disclosure, many variations can be made by those skilled in the art without departing from the spirit of this disclosure and the scope of the claims, which all fall within the scope of this disclosure.

What is claimed is:

1. A flap slat control lever, comprising:
a first displacement sensor to detect a displacement of the flap slat control lever and generate a first displacement detection signal;
a second displacement sensor to detect the displacement of the flap slat control lever and generate a second displacement detection signal;
a first control command module to receive the first displacement detection signal from the first displacement sensor; and
a second control command module to receive the second displacement detection signal from the second displacement sensor, wherein the first control command module is in a standby state and the second control command module is in a working state, the first control command module sends the first displacement detection signal to the second control command module, wherein the second control command module compares the first displacement detection signal with the second displacement detection signal, and if a difference between the first displacement detection signal and the second displacement detection signal is within an error tolerance, sends the first displacement detection signal or the second displacement detection signal to a slat/flap control computer as a control signal to control operation of flaps and slats.

2. The flap slat control lever of claim 1, wherein the second control command module sends either one, a larger one or a smaller one of the first displacement detection signal and the second displacement detection signal to the slat/flap control computer as the control signal to control the operation of the flaps and slats.

3. The flap slat control lever of claim 1, wherein if the first control command module is in failure, the first control command module will not send the first displacement detection signal to the second control command module, and the second control command module sends the second displacement detection signal to the slat/flap control computer as the control signal to control the operation of the flaps and slats; or
- if the second control command module is in failure, the second control command module is switched to a deactivated state, and the first control command module is switched to a working state, wherein the first control command module sends the first displacement detection signal to the slat/flap control computer as the control signal to control the operation of the flaps and slats.

4. The flap slat control lever of claim 3, wherein the first control command module and the second control command module verify whether the first displacement detection signal and the second displacement detection signal are within a preset range of values respectively,
- wherein the first control command module being in failure comprises the first control command module failing the verification of the first displacement detection signal, and
- wherein the second control command module being in failure comprises the second control command module failing the verification of the second displacement detection signal, or the second control command module determining that the difference between the first displacement detection signal and the second displacement detection signal is not within the error tolerance for a predetermined times.

5. The flap slat control lever of claim 1, wherein the first control command module and the second control command module each comprises a monitor channel and receives the first displacement detection signal from the first displacement sensor and the second displacement detection signal from the second displacement sensor respectively via the monitor channels.

6. The flap slat control lever of claim 1, further comprising:
- a lifting force mechanism to generate a lifting force for the flap slat control lever; and
- a friction force mechanism to generate a friction force during movement of the flap slat control lever, wherein the first control command module and the second control command module each comprises a control channel to control the lifting force of the lifting force mechanism and the friction force of the friction force mechanism when in the working state.

7. The flap slat control lever of claim 1, further comprising:
- a force sensor to sense a force applied on the flap slat control lever to generate a force signal; and
- a third control command module to receive the force signal, and if the force signal is above a preset threshold, send a valid discrete signal to the slat/flap control computer to extend the flaps and slats to a go-around configuration.

8. The flap slat control lever of claim 7, wherein the slat/flap control computer operates according to the valid discrete signal from the third control command module when receiving both the control signal from the first control command module or the second control command module and the valid discrete signal from the third control command module.

9. The flap slat control lever of claim 1, wherein the first displacement sensor and the second displacement sensor each comprises any one of a RVDT, a potentiometer, or a photoelectric encoder.

10. The flap slat control lever of claim 9, wherein the photoelectric encoder comprises a grating plate and a photoelectric detection device, wherein the photoelectric encoder outputs three groups of square wave pulses with phase-A, phase-B and phase-Z respectively, wherein two groups of pulses with phase-A and phase-B determine a motion direction of the lever, and the pulses with phase-Z determine a position of the lever.

11. A method for operating a flap slat control lever, comprising:
- detecting a displacement of the flap slat control lever and generating a first displacement detection signal;
- detecting the displacement of the flap slat control lever and generating a second displacement detection signal;
- using a first control command module to receive the first displacement detection signal; and
- using a second control command module to receive the second displacement detection signal, wherein the first control command module is in a standby state and the second control command module is in a working state, the first control command module sends the first displacement detection signal to the second control command module, wherein the second control command module compares the first displacement detection signal with the second displacement detection signal, and if a difference between the first displacement detection signal and the second displacement detection signal is within an error tolerance, sends the first displacement detection signal or the second displacement detection signal to a slat/flap control computer as a control signal to control operation of flaps and slats.

12. The method of claim 11, wherein the second control command module sends either one, a larger one or a smaller one of the first displacement detection signal and the second displacement detection signal to the slat/flap control computer as the control signal to control the operation of the flaps and slats.

13. The method of claim 11, wherein if the first control command module is in failure, the first control command module will not send the first displacement detection signal to the second control command module, and the second control command module sends the second displacement detection signal to the slat/flap control computer as the control signal to control the operation of the flaps and slats; or
- if the second control command module is in failure, the second control command module is switched to a deactivated state, and the first control command module is switched to a working state, wherein the first control command module sends the first displacement detection signal to the slat/flap control computer as the control signal to control the operation of the flaps and slats.

14. The method of claim 13, wherein the first control command module and the second control command module verify whether the first displacement detection signal and the second displacement detection signal are within a preset range of values respectively,
- wherein the first control command module being in failure comprises the first control command module failing the verification of the first displacement detection signal, and wherein the second control command module being in failure comprises the second control command module failing the verification of the second displacement detection signal, or the second control command module determining that the difference between the first displacement detection signal and the second displacement detection signal is not within the error tolerance for a predetermined times.

15. The method of claim 11, further comprising:

controlling, by the first control command module or the second control command module in the working state and through a control channel, a lifting force and a friction force of the flap slat control lever.

16. The method of claim 11, further comprising:

sensing a force applied on the flap slat control lever to generate a force signal; and using a third control command module to receive the force signal, and if the force signal is above a preset threshold, sending a valid discrete signal to the slat/flap control computer to extend the flaps and slats to a go-around configuration.

17. The method of claim 16, further comprising:

operating, by the slat/flap control computer, according to the valid discrete signal from the third control command module when receiving both the control signal from the first control command module or the second control command module and the valid discrete signal from the third control command module.

* * * * *